United States Patent [19]

Hoch, Jr. et al.

[11] Patent Number: 5,240,028

[45] Date of Patent: * Aug. 31, 1993

[54] TEMPERATURE SENSITIVE WATER SUPPLY SHUT-OFF SYSTEM

[75] Inventors: John R. Hoch, Jr., East Quogue; Bruce A. Moore, East Moriches, both of N.Y.

[73] Assignee: QP & H Manufacturing, Inc., Quogue, N.Y.

[*] Notice: The portion of the term of this patent subsequent to Feb. 25, 2009 has been disclaimed.

[21] Appl. No.: 839,568

[22] Filed: Feb. 24, 1992

Related U.S. Application Data

[63] Continuation-in-part of Ser. No. 707,958, May 22, 1991, Pat. No. 5,090,436, which is a continuation of Ser. No. 561,568, Aug. 2, 1990, abandoned.

[51] Int. Cl.5 .............................................. F16K 17/38
[52] U.S. Cl. ...................................... 137/80; 137/79; 137/312; 361/170
[58] Field of Search .................... 137/80, 312, 79; 251/129.02, 129.05; 361/170

[56] References Cited

U.S. PATENT DOCUMENTS

| | | |
|---|---|---|
| 2,271,833 | 2/1942 | Shipman et al. ..................... 277/21 |
| 2,775,291 | 12/1956 | Wilson ................................ 158/28 |
| 2,972,090 | 2/1961 | Lowrance ........................ 317/148.5 |
| 3,590,335 | 6/1971 | Tetar ............................... 317/148.5 |
| 3,738,609 | 6/1973 | Divigard ............................... 137/79 |
| 3,812,872 | 5/1974 | Block et al. ........................... 137/62 |
| 3,842,232 | 10/1974 | Long ................................... 219/513 |
| 4,256,133 | 3/1981 | Coward et al. ..................... 137/78.3 |
| 4,333,490 | 6/1982 | Enter, Sr. .............................. 137/80 |
| 4,545,396 | 10/1985 | Miller et al. ........................ 137/78.3 |
| 4,845,472 | 7/1989 | Gordon et al. ...................... 340/605 |
| 4,848,389 | 7/1989 | Pirkle .................................... 137/80 |
| 5,060,859 | 10/1991 | Bancroft ............................. 137/78.3 |

Primary Examiner—A. Michael Chambers
Attorney, Agent, or Firm—Morgan & Finnegan

[57] ABSTRACT

An automatic water supply shut-off system includes a shut-off valve movable between opened and closed positions in a line leading from the water supply. An electric motor actuates the shut-off valve and is electrically connected to a power source through an electric circuit so that when the circuit is closed the electric motor actuates the shut-off valve into the open position to allow water flow through the line. At least one temperature sensor feeds a signal to a logic circuit that controls a switch. The switch cuts off the supply of power to the electric motor when the sensor senses a temperature corresponding to a freeze condition.

13 Claims, 6 Drawing Sheets

TEMPERATURE SENSITIVE WATER SUPPLY SHUT-OFF SYSTEM

This is a continuation-in-part of pending U.S. Ser. No. 07/707,958 filed May 22, 1991, now U.S. Pat. No. 5,090,436 issued Feb. 25, 1992, which is a continuation of U.S. Ser. No. 07/561,568 filed Aug. 2, 1990, now abandoned.

BACKGROUND OF THE INVENTION

1. Field of the Invention

The present invention relates generally to the field of plumbing and, more specifically, to a system for shutting off a supply of water upon detection of a pipe-freezing condition.

2. Description of the Related Art

Freezing water in household plumbing results in millions of dollars worth of property damage every year. When water in a pipe freezes, it expands and, since the internal volume of the pipe is fixed, the pipe will rupture. After the pipe ruptures, water does not usually escape from the pipe until after thawing. However, once thawing occurs, the potential for property damage is great since a ruptured pipe is capable of releasing water at a high rate.

Usually the homeowner is not immediately aware of the ruptured pipe, for reasons such as the home may be used as a vacation home and not occupied frequently. Also, since the release of water does not usually occur until after thawing, a pipe may freeze overnight and then thaw during the day when the occupant is away from home for work or other reasons. Thus, most property damage occurs when the house is unoccupied.

Even if the house is occupied at the time the pipe thaws and water is released from the point of rupture, not all homeowners have convenient access to their water supply for the purpose of shutting off the same. Since pipe ruptures frequently occur within walls of the house, even a few minutes of water flow from the rupture can result in substantial property damage to wall board, electrical wiring, carpets, furniture, etc. A need exists for a simple, reliable system for shutting off the supply of water in the event of a freeze condition.

SUMMARY OF THE INVENTION

An object of the present invention is to provide an automatic water shut-off system capable of cutting off the water supply when a predetermined temperature is sensed.

Another object of the present invention is to provide an automatic water shut-off system which is relatively simple in construction and cost effective to produce, and can be purchased in kit form.

Yet another object of the present invention is to provide a system for shutting off a water supply in which the sensors used in the system shut off power to an actuator.

Another object of the present invention is to provide an emergency on/off switch for a water supply shut-off valve so that the water supply can be manually shut off from a location remote from the water supply. These and other objects of the invention are met by providing an automatic water supply shut-off system which includes a shut-off valve movable between open and closed positions in a line leading from the water supply, an electric motor for actuating the shut-off valve and being electrically connected to a power source through an electrical circuit so that when the electrical circuit is closed the electric motor actuates the shut-off valve into the open position to allow water flow through the line, and at least one temperature sensitive switch disposed in the electrical circuit and being operative to normally close the electrical circuit above a predetermined temperature and to open the electrical circuit at or below the predetermined temperature, whereby the shut-off valve moves to a closed position.

Optionally, the system includes a manually operated on/off switch located remotely from the water supply.

These and other features and advantages of the automatic water supply shut-off system according to the present invention will become more apparent with reference to the following detailed description and drawings.

DETAILED DESCRIPTION OF THE PREFERRED EMBODIMENTS

Figure 1:
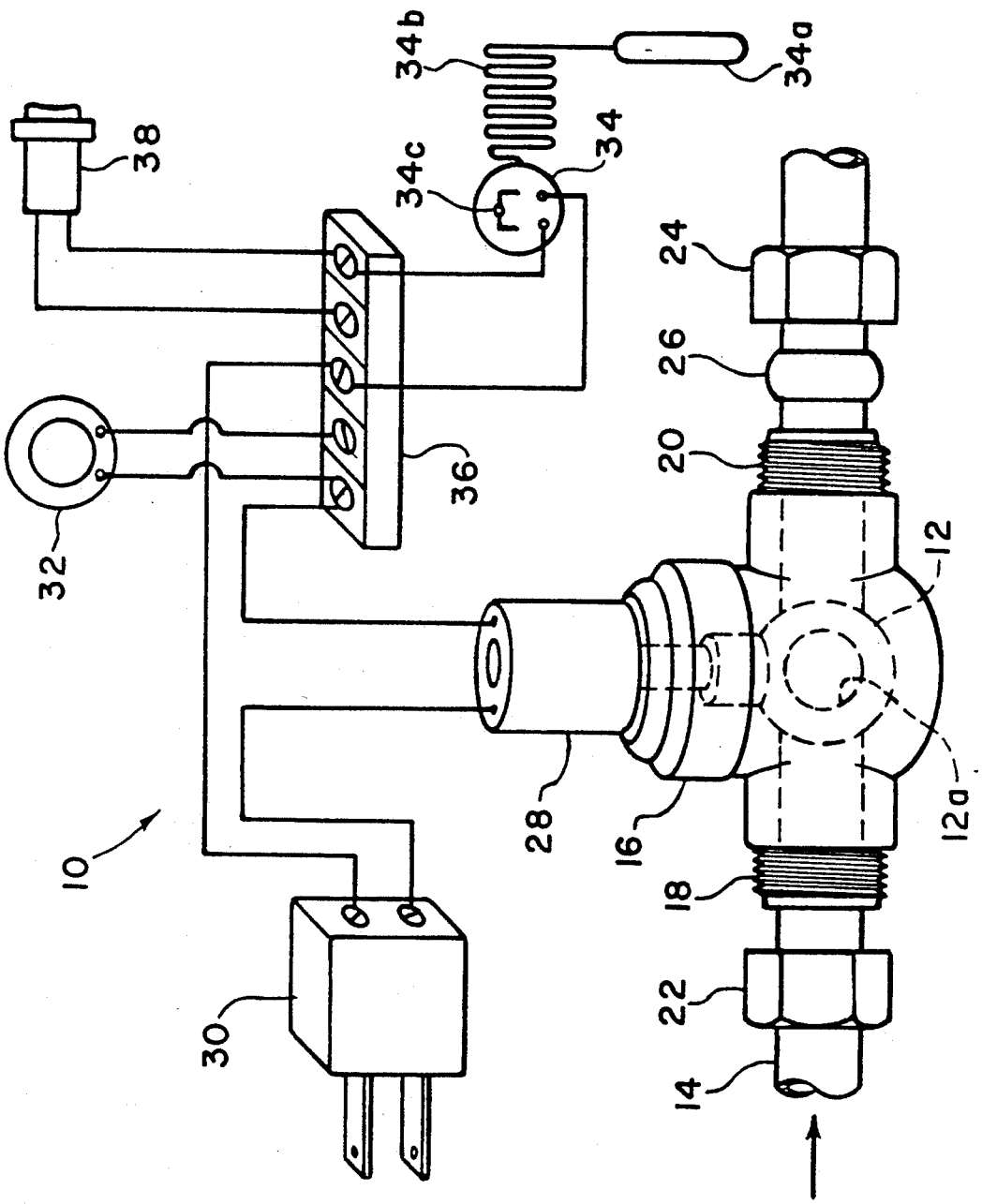
FIG. 1 is a schematic view of a system according to a first preferred embodiment of the present invention.

Referring now to FIG. 1, an automatic water supply shut-off system according to the present invention is generally referred to by the numeral 10, and includes a shut-off valve 12 movable between open and closed positions in a line 14 leading from a water supply, for example, a metered central water supply or from a well which pumps water to a pressure tank within the household. The metered water supply, as well as the pressure tank are normally disposed in the basement or, for houses without basements, in garages. Generally, the water supply has a manually operated gate valve having a circular handle, and this valve can be used to shut off the water supply when a rupture occurs. The problem, as discussed before, is that the normal household water supply shut-off valve cannot be manually closed until after substantial damage has been done.

The automatic shut-off valve 12 of the present invention is disposed in a valve body which is provided with inlet and outlet fittings 18 and 20, respectively so as to couple the line 14 to the opposite ends of the body 16 with threaded fasteners 22 and 24 which coact with compression ferrules 26 to create a water-tight fit. The valve body can be fitted into an existing pipe, preferably near the source or water supply, either upstream or downstream of the material shut-off valve (not shown). Alternatively, the valve could be conventionally plumbed by using copper mail adapters or other conventional plumbing fixtures.

A solenoid 28 is mounted on the valve body 16 and is operatively connected to the valve 12 for actuating the shut-off valve, thereby driving same between open and closed positions. In the schematic illustration of FIG. 1, the valve 12 is shown as a ball valve which can be rotated 90° by the solenoid through intermediate drive means which converts linear motion of, for example, the stator of the solenoid to rotational movement of the valve, in order to move a central passageway 12a of the valve 12 between positions of alignment with the line 14 and non-alignment. In the non-alignment position, the passageway is turned 90° to the line 14, thus constituting a blocking position as shown in FIG. 1. Other types of valves can be employed such as gate valves which move axially into and out of blocking positions within the body 16, and diaphragm valves, where the solenoid moves a diaphragm between blocking and non-blocking positions.

The solenoid 28 is electrically connected to a power source 30 which is preferably a 110-24 volt AC step-down transformer which supplies power to the 24 volt solenoid by plugging into a normal household outlet.

An electrical circuit connects the power supply to the solenoid and to at least one temperature sensitive switch 32 and 34 so that when the circuit is closed the electric motor or solenoid 28 actuates the shut-off valve 12 into the open position to allow water flow through the line 14. If there is more than one temperature sensitive switch, the switches are arranged in series so that if any one of these switches is open, the power supply is cut off to the solenoid and the valve 12 will return to the closed position by return means, such as a spring return associated with the solenoid. This arrangement provides that when power is on the system will operate normally, but if power is cut off the system will fail safe, such that the valve 12 will move to the closed position in the event of a loss of power.

Figure 2:
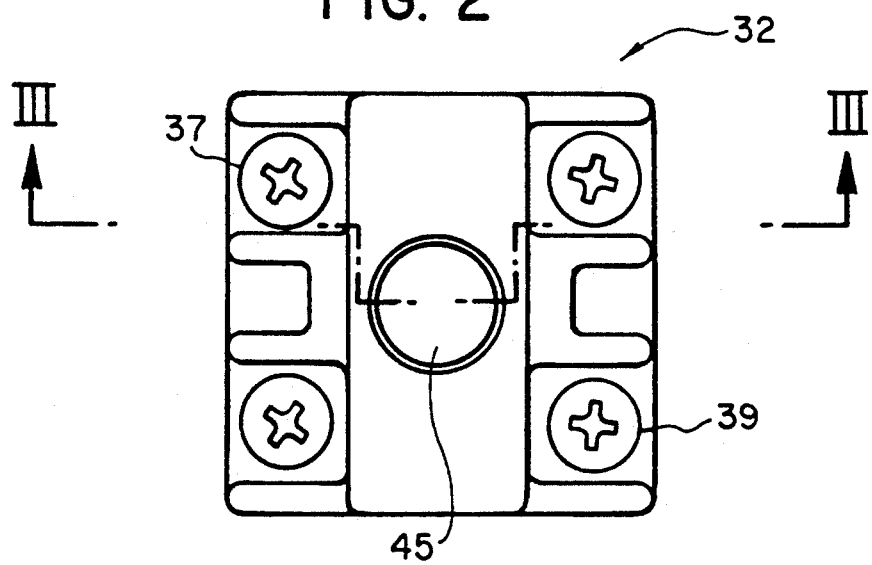
FIG. 2 is a rear view of a bi-metallic disk sensor used in the system of FIG. 1.
Figure 3A:
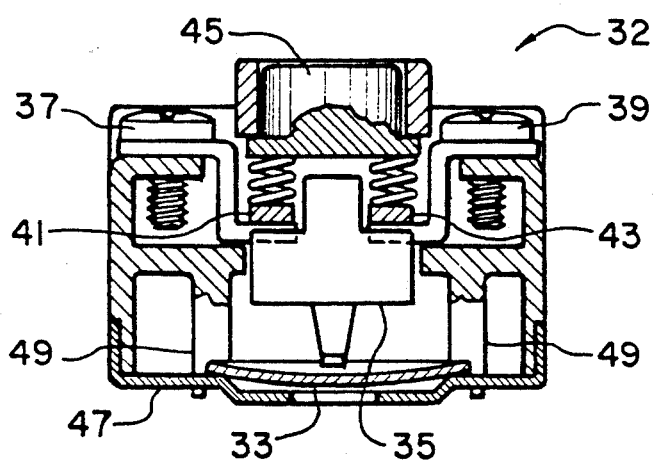
FIGS. 3(a) and 3(b) are sectional views of the sensor of FIG. 2, showing switch-closed and switch-open positions.
Figure 3B:
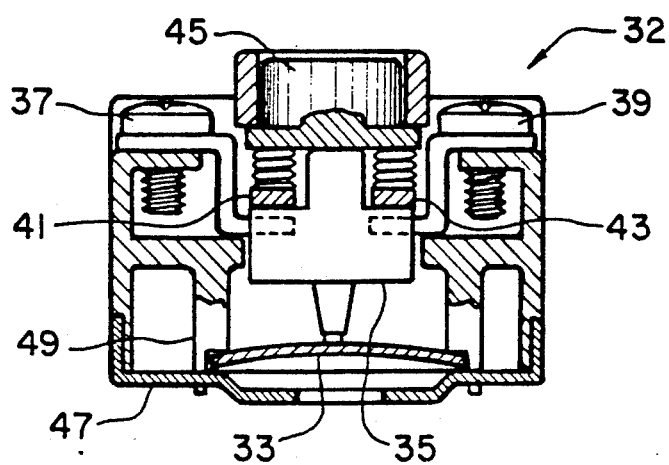

In FIG. 1, two sensors 32 and 34 are illustrated. These are connected to the rest of the system through a terminal block 36, which can be expanded in size to match the required number of sensors. Also, a manually operated switch 38 can optionally be provided in the system. This switch is preferably located within the house such as in the kitchen or any other location where the occupants can easily and quickly shut off the water supply without having to locate the manually operated water supply shut-off valve. This feature is particularly useful for elderly and handicapped people. An essential aspect of the present invention is the sensor itself, which in one embodiment is a switching device. Referring to FIGS. 2 and 3(a) and 3(b), the switch 32 employs a bi-metallic disk (33) to make and break an electrical contact. The disk is made of different metals which have different thermal expansion properties so that, at a predetermined temperature, the disk pops into a warped position. When the disk warps, it is held in a position in which it is capable of separating electrical contacts so as to open the electrical circuit and thereby cut the power supply from the solenoid. When the power supply is cut to the solenoid, the shut-off valve returns to the closed position, preferably by a return spring (not shown).

FIG. 3(a) shows the switch 32 in the normally closed position, whereby at temperatures above 36° F., plus or minus 3°, for example, the disk 33 is warped towards the outside of the switch and thus has a concave surface which abuts an axially movable cross piece 35. Normally, an electrical circuit is completed from terminals 37 to terminals 39 by conductive bars 41 and 43 which are spring biased into electrical contact with corresponding contact pieces of the terminals. When the disk 33 warps, as shown in FIG. 3(b), the cross piece 35 moves upwardly and lifts the conductive bars 41 and 43 off the contact pieces, thereby opening the circuit and preventing electricity from flowing through the switch. In this position, the disk 33 has a convex surface which pushes the cross piece 35 upwardly and holds it in an upward position until the disk 33 is manually re-set by pushing a reset button 45. The disk 33 is held in position between a cover plate 47 and mounting supports 49. Thus, when the re-set button 45 is pushed downwardly, the lower end of the cross piece 35 pushes the center of the disk 33 and causes it to "pop" back into the concave-warped position.

The present invention is thus based on the concept of the sensing of ambient air temperature. When the air temperature reaches a predetermined temperature, such that a freezing condition is eminent, the bi-metallic disk 33 of the switch 32 will warp and thereby break an electrical contact within the switch block. Thus, the switch acts as a temperature sensor and operates mechanically, meaning that the sensor does not require electricity to "sense". Moreover, due to the simple construction of the sensor, the sensor will operate reliably and will be cost effective to produce. The sensor or switch 32 is not invasive to the plumbing system, in that it does not have to be disposed within the plumbing, and can be attached simply at any desired location within the house, such as at areas prone to freezing (north walls, for example).

Another important aspect of the bi-metallic disk is that, after the predetermined temperature of, for example, 36°, has been reached, and the disk has warped to break the electrical contact of the switch, the disk will maintain the warped shape until manually re-set. Thus, the switch 32 is provided with a reset button, whereby the switch will keep the circuit open until the reset button is pushed, so that the water supply is not prematurely re-opened. The sensor or switch 32 can be placed near the automatic shut-off valve 12 or it can be placed remotely anywhere a potential freezing problem exists within a building. The bi-metallic disk is, in one embodiment, about one inch in diameter and approximately one half millimeter in thickness.

In some situations, there exists a need to more closely and precisely sense the temperature of the ambient air. In this case, a sensor such as the one illustrated in FIG. 1 as element 34 can be used. The sensor 34 is nonetheless a switch which has a throw which is moved to the open position by fluid from a capillary tube 34a connected to a sensing bulb 34b. The sensing bulb can be inserted into a wall by drilling a very small hole in an inconspicuous location so that the sensing bulb is inserted into the wall. The switch itself can be mounted over the hole, nearly flush with the wall so as to be unobtrusive. As the temperature falls, fluid from within the capillary tube retreats and allows the throw to move into the open position. The sensor or switch 34 is also provided with a manual re-set 34c so that if the switch is open, thus opening the electrical circuit which includes a solenoid, the switch cannot be closed unless manually re-set. Capillary type sensors as described above are generally commercially available through White-Rogers.

A preferred embodiment of the present invention is a diaphragm type valve, in which a diaphragm normally closes a passageway through the valve body, and the diaphragm is moved to an open position by the solenoid. A solenoid and valve assembly of this type is commercially available through Richdel Company of Carson City, Nev., and through RAIN BIRD of Glendora, Calif. This type of valve and solenoid combination is used in irrigation systems.

Figure 4:
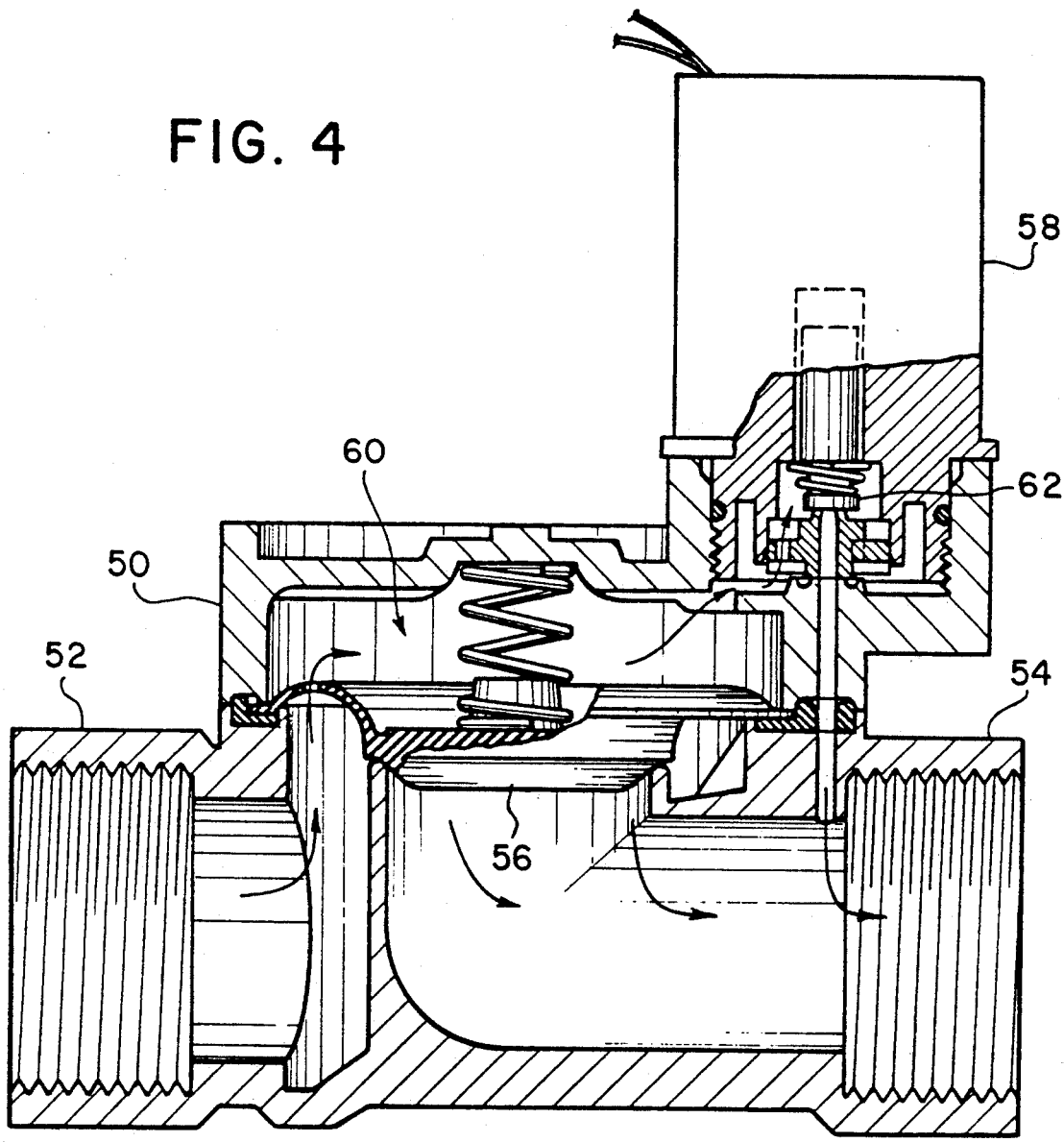
FIG. 4 is a sectional view showing details of a preferred diaphragm valve assembly.

FIG. 4 is a sectional view showing a preferred embodiment of the valves, to be used in place of the valve assembly shown in FIG. 4. The valve assembly includes a valve body 50 through which water passes by entering the inlet 52 and leaving the exit 54. A diaphragm valve element 56 is spring biased towards a seated position, whereby the flow of water from the inlet 52 to the outlet 54 is blocked. A solenoid 58 is used to regulate an air passage which communicates an upper chamber 60 of the valve body 50 with an area of the valve body downstream of the diaphragm valve element 56. In the open condition, the air passage is unrestricted and a venturi effect is created which evacuates air from the upper chamber 60, so that the diaphragm is permitted to move upwardly into an unseated position In this condition, the solenoid 58 may be energized so that the element 62 is lifted upwardly off a port of the air passage. If the switches described herein detect a freeze condition so that the solenoid is de-energized, the element 62 is returned by spring force to seat over the port of the air passage, thus preventing the venturi effect and allowing the diaphragm valve element 56 to seat.

This type of valve has been identified previously as the RAIN BIRD, which is manufactured in Glendora, Calif. A unique feature of this type of valve is that the solenoid can be turned, due to its threaded connection to the valve body 50, so that the air passage can be blocked by causing the end of the solenoid to seat completely in its receiving bore. This feature allows the valve assembly to be manually overridden, if necessary.

THE EMBODIMENT OF FIGURES 5, 5(a), 6(b) AND 7

Figure 5:
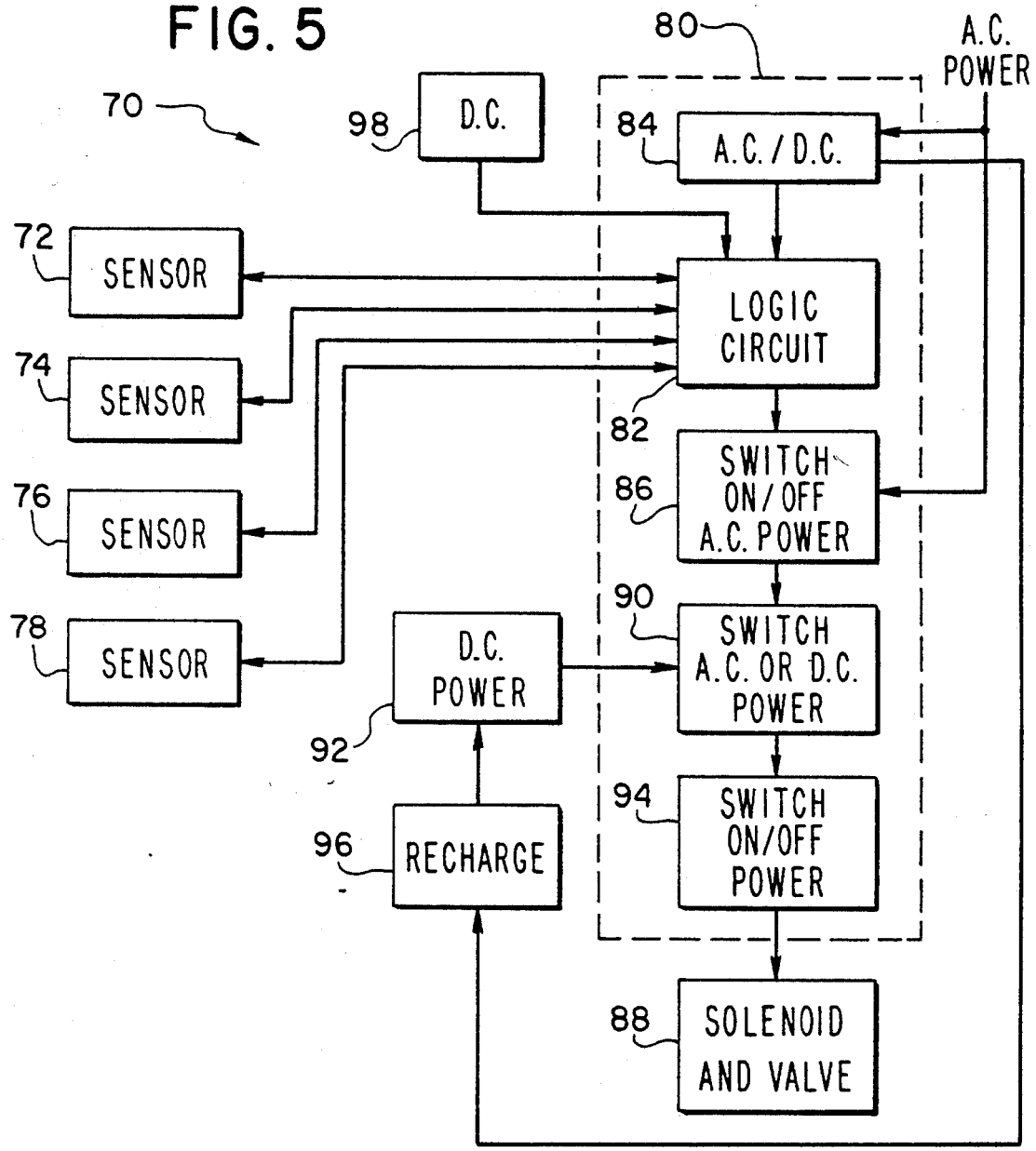
FIG. 5 is a block diagram of another embodiment of the present invention.

The aforementioned system can be operated electronically using electronic temperature sensors, a logic circuit and a plurality of switches. As seen in FIG. 5, another embodiment of ambient temperature responsive shut-off system 70 includes a plurality of sensors 72, 74, 76, and 78, each of which is located in a different zone of a house, for example. Additional or fewer sensors may be employed, depending on site-specific needs. Each sensor produces a voltage signal which varies in accordance with variations in ambient temperature. A control unit 80, in the form of a self contained box having circuitry inside and being mountable at a convenient location inside the house, includes a logic circuit 82 which determines whether any one of the plurality of sensors reads a temperature below a threshold value of, for example, 37° F. This threshold temperature is predetermined to correspond to a freeze condition. The control unit receives a.c. power from a household source, after being knocked down by a transformer (not shown) to 24 V a.c. An a.c. to d.c. converter 84 takes the a.c. power supply and converts it into d.c. power for the logic circuit. The sensors 72, 74, 76 and 78 also are powered by d.c. current and produce an output voltage signal based thereon.

The a.c. power supply is also fed to a switch 86 which is operatively controlled by the logic circuit 82. The switch 86 is normally closed to permit a.c. current to flow therethrough to the solenoid 88. So long as current flows to the solenoid 88, the valve associated with the solenoid 88 is maintained in an open position.

A by-pass switch 90 is manually actuated by push-button, toggle, or any other suitable mechanism and permits the logic circuit-controlled a.c. power supply to be switched "off" and a separate d.c. power source 92 to be switched "on". The d.c. power source may be, for example, a pair of 12 volt d.c. batteries coupled to produce 24 volt d.c. output. The by-pass switch 90 is used when a sustained power outage occurs and the occupants need to use water. Normally, with power off, the system 70 shuts off the supply of water because power is necessary to maintain the valve in the "open" position. The valve closes automatically when power is removed from the solenoid 88. The bypass switch may also be used in a freeze condition where the sensors have detected the condition and caused the a.c. power to be shut off. The d.c. power source 92 can be re-charged with a re-charge circuit 96 powered by d.c. current from the a.c./d.c. converter 84.

Regardless of whether the solenoid is being supplied with a.c. power or d.c. power, a kill switch 94 is provided to cut off the supply of water, manually, at any time determined by the home occupant.

A second, smaller d.c. power source 98 is used as a logic back-up in case of short term power loss. The power source 98 may be, for example, a 9 volt d.c. battery having power storage capable of maintaining the logic circuit 82 in its current state when power from the a.c. source is disturbed. The 9 volt battery is not capable of maintaining the solenoid 88 in a powered condition. When the a.c. power goes off, the water will be turned off; however, when a.c. power is restored, the logic circuit will not have to be re-set since the 9 volt battery maintains the logic state.

Figure 6A:
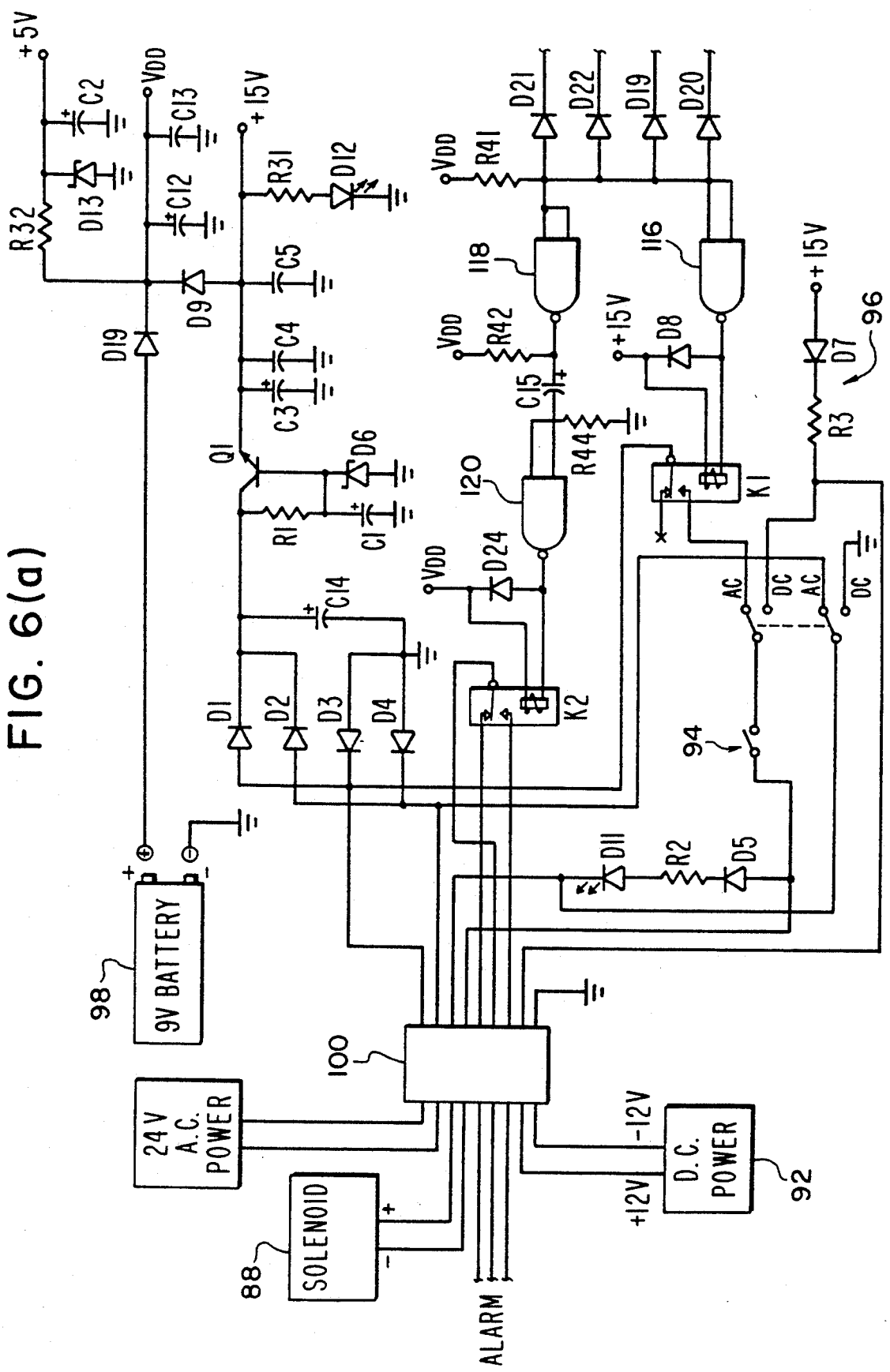
FIGS. 6(a) and 6(b) are collectively a wiring schematic of the embodiment of FIG. 5.
Figure 6B:
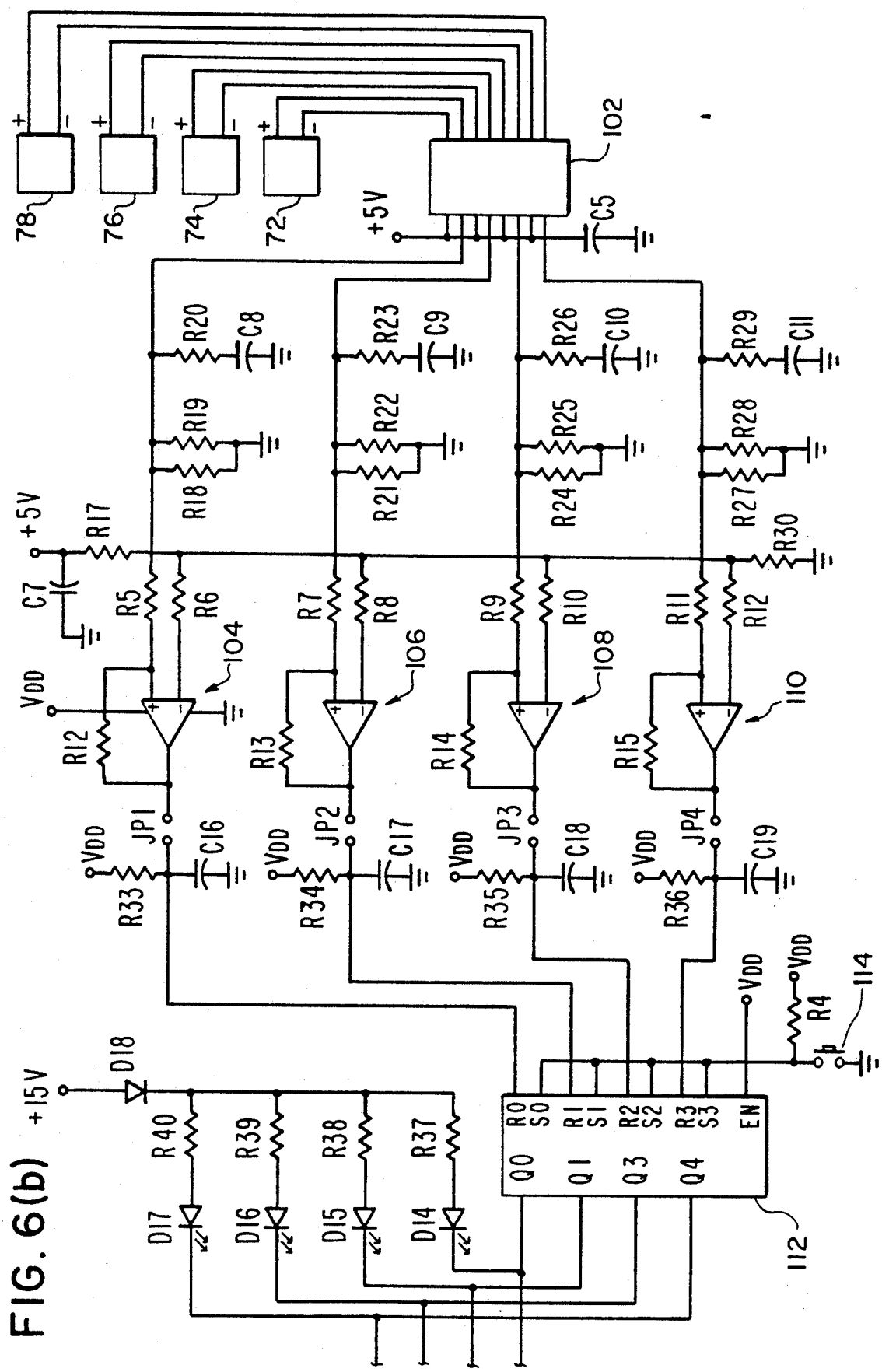

Referring to FIG. 6(a) and 6(b) which are two sections of the same circuit diagram, a terminal block 100 couples 24 volt a.c. leads from an a.c. power source, such as a step down transformer (not shown) which takes standard household a.c. current. Rectifiers D1–D4 convert a.c. current to d.c., and capacitor C14 provides sag protection. The capacitor C14 may be a 2200 µf 50 V axial, in a specific application. A regulator function is performed by zener diode D6, capacitor C1, power transistor Q1, and resistor R1, to keep voltage at a constant level of about 15 volts. A filtering function is performed by capacitors C3 and C4 to smooth out the pulsating d.c. current and make it constant.

The smaller d.c. power source 98 seen in FIG. 5 is coupled to the circuit to power the logic circuit, but not the solenoid, in the event of an a.c. power failure. Rectifier D19 prevents current from the circuit, powered by the 24 volt a.c. source from entering the battery 98, and rectifier D9 prevents 9 volt current from going to the household wiring system. Capacitors C12, C13, C2, resistor R32, and zener diode D13 regulate the 9 volt battery. An a.c. power "on" light emitting diode (LED) D12 indicates that a.c. power is on and thus the system should be operating normally.

A relay K1, is connected to the a.c. voltage line and acts as a switch to open and close a power circuit leading to the solenoid. Thus, relay K1 is the switch 86 of FIG. 5. Power output to the solenoid requires the positioning of three "switches". The first switch is the relay K1. It has a throw which is normally actuated to a closed position when current flows through a coil therein to permit current to flow to the solenoid. The logic circuit changes the status of the relay, as will be described below.

Current flowing through relay K1 next passes through manual switches 93 and 94. Switch 93, the manual override switch, has a throw movable from a.c. contacts to d.c. contacts so that when the a.c. power supply is cut off from the solenoid, the solenoid is then directly powered by the d.c. power supply 92. The re-charge circuit 96 includes a rectifier D7 and resister R3. When current is flowing to the solenoid, LED D11 will be illuminated, after current passes through resistor R2 and rectifier D5. In FIG. 6(a), switch 93 is shown in the a.c. power position while switch 94 is shown in the open circuit or "kill" position. Thus, to illuminate LED D11, switch 94 must be in the closed position.

A terminal block 102, as seen in FIG. 6(b), receives the plus and minus leads of the four sensors 72, 74, 76, and 78. Each sensor produces a voltage signal which varies in accordance with temperature, such that as temperature falls, voltage falls.

Isolation devices or comparators 104, 106, 108, 110, which may be part of a single integrated circuit such as a National Semiconductor LM339N logic chip. Each sensor voltage is applied to the plus input pin (after resistors R18-R29 and capacitors C8-C11) and a reference voltage of 5 V is applied to the minus input pin. The output pin is a digital "high" or "low" voltage, corresponding to a "1" or "0" in digital logic. A "high" corresponds to the sensor detecting a temperature that exceeds the predetermined threshold temperature of, for example, 37° F. If any one of the sensors 72, 74, 76, and 78 detects a temperature below the threshold, the output of the corresponding device 104, 106, 108 or 110 will read low. The outputs of devices 104, 106, 108 and 110 are delivered through jumpers JP1, JP2, JP3 and JP4 to a reset/set (RS) latch 112, which may be an integrated circuit such as a Motorola MC14044BCP CMOS chip. This particular device has its set inputs "high" or "1" at pins S0, S1, S2, and S3. A manually operated reset button of a reset switch 114 turns the sets to low or "0" after a freeze condition has been detected. The reset pins R0, R1, R2, and R3 input "high" or "low" according to the sensed temperature.

RS latch 112 has the following truth table:

| S | R | E | Q |
|---|---|---|---|
| X | X | O | High Impendence |
| O | 0 | 1 | 0 |
| 0 | 1 | 1 | 1 |
| 1 | 0 | 1 | 0 |
| 1 | 1 | 1 | No Change |

X = don't care
Q = output
S = set
R = Reset
E = Enable

This means that if any one of the sensors 72, 74, 76, 78 produces a "low" or "O" input to the RS latch 112, and since the sets are "high" or "1",the output of the RS latch 112 will be "low" or "0". The low voltage at the output pin causes current to flow to illuminate a corresponding one of the LED's D14, D15, D16 or D17. Depending on which sensor or sensors are detecting a freeze condition, the "low" or "0" logic condition is fed to a NAND gate 116 is seen in FIG. 6(a). The "low" input of the NAND gate 116 is inverted to a "high" output. Relay K1 has a coil supplied with a relatively high voltage. A "high" voltage at the output pin of NAND gate 116 prevents current from flowing through the coil, so that the throw of a switch in the relay K1 returns to the "open circuit" position as seen in FIG. 6(a). If no freeze conditions is detected by one of the sensors, the "high" input of NAND gate 116 is inverted to "low" so that current flows in the coil and the throw is moved to the "closed circuit" position.

Power flows to the solenoid 88 assuming that switch 92 is in the a.c. position (no override), switch 94 is in a closed position (No kill), and current flows through the coil of relay K1.

At the same time, the "low" logic output of the RS latch 112 provides a "low" input to NAND gate 118 and is inverted to "high" at output pin, and inverted to "low" at the output pin of NAND gate 120. This "low" voltage state causes current to flow in a coil of a second relay K2, thus moving a throw to a closed circuit position to permit an alarm signal of a separate alarm system to be delivered. Thus, if the homeowner has a separate security or fire alarm system in the house for automatively sending a break-in or emergency signal to a security monitoring agency, the same monitoring agency could be notified of a freeze condition in the house.

After a freeze condition has been detected and the power to the solenoid cut off by relay K1, the logic circuit will not permit restoration of power until to reset button of the reset switch 114 is pressed. Then, all the "sets" become "low" and the logic circuit is ready to function again.

Figure 7:
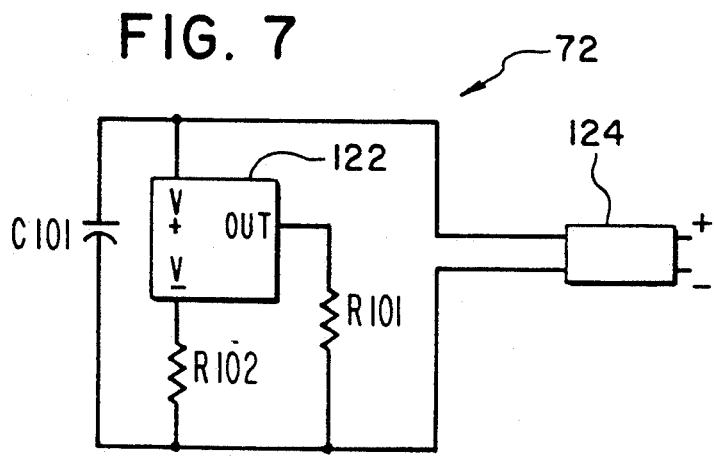
FIG. 7 is a wiring schematic of a sensor used in the FIG. 5 embodiment.

FIG. 7 is a wiring diagram of one of the sensors 72, all sensors being identical but physically located in different locations in the house. The sensor 72 is a commercially available ambient air temperature sensor which includes an integrated circuit (IC) 122 whose output voltage is linearly proportional to ambient temperature. The IC 122 is sold by National Semiconductor under the series designation LM 35D, which has a low output impendence and draws about 60μA. The LM35D is essentially a transistor in a plastic package. A terminal block 124 connects positive and negative leads to the sensor circuit, which includes capacitor C101 (0.1μf) and resistors R101 and R102 (2K 1%).

Numerous modifications and adaptations of the present invention will be apparent to those so skilled in the art and thus, it is intended by the following claims to cover all such modifications and adaptations which fall within the true spirit and scope of the invention.

What is claimed is:

1. A water supply shut-off system comprising:
    a shut-off valve connectable to an indoor plumbing network and having an open position and a closed position;
    a power circuit connectable to a primary power supply and including electric motor means for actuating the shut-off valve from the closed position to the open position when the power circuit is in a closed circuit condition so that the electric motor means is supplied with electric energy, the valve returning to the closed position when the power circuit is in an open circuit condition so that the electric motor means is not supplied with electric energy, and first switch means for changing the condition of the power circuit;
    a control circuit including at least one sensor means, mountable indoors, for producing a signal indicative of ambient temperature and comparison means, for comparing the signal of the sensor means to a predetermined threshold temperature and outputting a control signal to cause the first switch means to change the condition of the power circuit to open when the ambient temperature is at or below the threshold value; and manual reset means for changing the condition of the power circuit back to closed when the ambient temperature exceeds the threshold temperature.

2. A water supply shut-off system according to claim 1, further comprising a secondary supply of electric energy electrically connectable to the electric motor means and second switch means, manually actuatable, for selectively switching the supply of electric energy delivered to the electric motor means between the primary supply of electric energy and the secondary supply of electric energy.

3. A water supply shut-off system according to claim 2, further comprising third switch means, manually actuatable, for cutting off the selected supply of electric energy from the electric motor means.

4. A water supply shut-off system according to claim 1, wherein the comparing means includes an RS latch operatively coupled to the reset means for manually resetting the RS latch to enable the first switch means to permit the supply of electric energy to return to the electric motor means after the sensor means has detected a temperature below the threshold temperature.

5. A water supply shut-off system according to claim 2, wherein the secondary supply of electric energy is a d.c. battery and a recharge circuit coupled between the primary supply of electric energy and the secondary supply of electric energy to recharge the d.c. battery.

6. A water supply shut-off system according to claim 1, wherein the comparing means comprises a logic circuit powered by d.c. power converted from the primary supply of electric energy, and includes a power back-up means for supplying a back-up supply of power to the logic circuit when the primary supply of electric energy is cut off.

7. A water supply shut-off system according to claim 1, further comprising first indicator means for indicating when the primary supply of electric energy is on.

8. A water supply shut-off system according to claim 7, further comprising second indicator means for indicating when electric energy from either the primary or secondary source is being supplied to the electric motor means.

9. A water supply shut-off system according to claim 8, further comprising third indicator means for indicating when the sensor means has detected an ambient temperature below the threshold temperature.

10. A water supply shut-off system according to claim 9, wherein the first, second and third indicator means are light emitting diodes.

11. A water supply shut-off system according to claim 1, wherein the sensor means includes a transistor whose voltage output varies in accordance with variations in ambient temperature.

12. A water supply shut-off system according to claim 1, further comprising means, responsive to the comparing means, for turning on an alarm when the sensor means senses a temperature at or below the threshold temperature.

13. A water supply shut-off system according to claim 1, wherein the first switch means comprises a first relay.

* * * * *